US008929467B1

(12) United States Patent
Xiu

(10) Patent No.: US 8,929,467 B1
(45) Date of Patent: Jan. 6, 2015

(54) CIRCUITS AND METHODS FOR ONE-WIRE COMMUNICATION BUS OF USING PULSE-EDGE FOR CLOCK AND PULSE-DUTY-CYCLE FOR DATA

(71) Applicant: Liming Xiu, Plano, TX (US)

(72) Inventor: Liming Xiu, Plano, TX (US)

(73) Assignee: Liming Xiu, Plano, TX (US)

( * ) Notice: Subject to any disclaimer, the term of this patent is extended or adjusted under 35 U.S.C. 154(b) by 0 days.

(21) Appl. No.: 14/153,148

(22) Filed: Jan. 13, 2014

(51) Int. Cl.
*H04B 3/00* (2006.01)
*H04L 7/00* (2006.01)

(52) U.S. Cl.
CPC .................................. *H04L 7/0041* (2013.01)
USPC ........... 375/257; 375/220; 375/356; 375/355; 375/372; 375/373; 375/376

(58) Field of Classification Search
USPC .......... 375/257, 220, 356, 355, 372, 376, 373
See application file for complete search history.

(56) References Cited

U.S. PATENT DOCUMENTS

| 2002/0154721 A1* | 10/2002 | Harrison | 375/374 |
| 2008/0278211 A1* | 11/2008 | Heightley | 327/296 |
| 2009/0058481 A1* | 3/2009 | Kim et al. | 327/175 |

* cited by examiner

*Primary Examiner* — Kabir A Timory

(57) ABSTRACT

A one-wire communication bus for transferring a sequence of digital data from a transmitter to a receiver includes (a) an ECDD signal modulation circuit to create an electrical pulse train wherein each pulse's edge is used as clock signal and each pulse's duty cycle is used to represent digital value of zero and one; (b) an ECDD signal demodulation circuit to receive the ECDD pulse train using a group of sampling cells and to decode the sampled results using a majority voting circuit; (c) an electrical connection between a transmitter wherein the ECDD signal modulation circuit resides and a receiver wherein the ECDD signal demodulation circuit resides. Said ECDD signal is sent from the transmitter to the receiver through the electrical connection. Methods of creating the ECDD pulse train in the transmitter and decoding the ECDD pulse train in the receiver are also disclosed.

14 Claims, 5 Drawing Sheets

CIRCUITS AND METHODS FOR ONE-WIRE COMMUNICATION BUS OF USING PULSE-EDGE FOR CLOCK AND PULSE-DUTY-CYCLE FOR DATA

FIELD OF THE INVENTION

The present invention generally relates to the field of integrated circuit. More specifically, embodiments of the present invention pertain to circuits and methods of sending digital data from a transmitter circuit to a receiver circuit.

DISCUSSION OF THE BACKGROUND

In many modern applications, an electronic system is made of multiple of subsystems. These subsystems could be blocks, modules or discrete chips. For successful operation, one of the key tasks is the data communication among the subsystems. Data communication refers to the work of transferring information from one subsystem to one (or more) other subsystem(s). The information sender is often termed transmitter and the information taker is called receiver. The information transfer can be carried out in either digital or analog fashion. In most modern systems, digital data communication is the preferred method due to its low cost, high data rate and high reliability.

FIG. 1 shows the structure of a typical transmitter and receiver system where a sequence of digital data is to be transferred from the transmitter to the receiver. Transmitter subsystem 110 has a signal processing & transmitter circuit 111 and a clock generation circuit 112. Circuit 111 is used to generate the signal data that needs to be transferred. It also has a transmitter circuit that outputs the data to the transmission channel. Circuit 111 is operated under the control of a clock signal clk_t which is generated from circuit 112. Usually, the data is sent to the channel at the same rate of clk_t. At the receiver side, subsystem 120 has a receiver & signal processing circuit 121. It also has its own clock generation circuit 122 that produces a clock signal clk_r. Circuit 121 is operated under the control of clk_r.

Between the transmitter and the receiver, there are two electrical channels for carrying out the communication task. WIRE_D 130 is used for data and WIRE_C 140 is for clock. Since both the data and clock signals are sent from the transmitter, the receiver can simply use the received clock signal to latch the received data. The major advantage of this scheme is that the receiver is always operated at the same, or in a fixed proportional, rate of that of the transmitter. Thus, it significantly reduces the possibility of data loss.

However, there are a few drawbacks with this scheme. The first one is the high cost. As shown, to transfer one sequence of digital data, two electrical paths are required. This fact not only increases the manufacture cost but also demands larger physical area in the system to accommodate all the paths. In some applications, there could be tens or hundreds of transmitter-receiver pairs in the system. In those cases, the two-paths-solution requires large amount of resource to fabricate the system. Further, the physical layout of these many paths can cause route congestion problem if the physical size of the system is not large enough.

The second problem is the skew between the data and clock signals when they arrive at the receiver. Mostly likely, the data and clock will arrive at their destinations at different times since they are transferred in different electrical paths with different time delays. This time difference is called skew. The amount of skew is hard to be predicted in the chip design time since it will be largely affected by the PCB board design and many other factors. The amount of skew can take large portion of the bit time. This can cause the receiver to make error when latching the data since the received clock is not aligned properly with the received data. The higher the clock rate (the shorter the bit time) is, the severer the problem will be. When multiple data paths are accompanied by one clock path, this scheme becomes almost impossible to use since different data paths experience different delays and it is difficult for the clock generation circuit in the receiver to decide which data path is the target for delay (or phase) optimization.

This "Discussion of the Background" section is provided for background information only. The statements in this "Discussion of the Background" are not an admission that the subject matter disclosed in this "Discussion of the Background" section constitutes prior art to the present disclosure, and no part of this "Discussion of the Background" section may be used as an admission that any part of this application, including this "Discussion of the Background" section, constitutes prior art to the present disclosure.

SUMMARY OF THE INVENTION

It is therefore an object of the present invention to combine data signal and clock signal into one electrical signal and use it for data communication between a transmitter and a receiver so that the skew problem between the data and clock is eliminated. It is a further object of the present invention to reduce the number of electrical paths between the transmitter and the receiver to achieve the goals of lower cost, higher reliability and smaller physical size.

The present invention relates to circuits and systems that use a direct period synthesizer to create an electrical signal whose pulse edge functions as clock signal and whose pulse duty cycle is used to represent digital value of zero and one. Thus, the present invention advantageously combines two electrical signals into one that can result in the reduction in manufacture cost and system physical size. The present invention further improves the system reliability by eliminating the skew problem. These and other advantages of the present invention will become readily apparent from the detailed description of various embodiments below.

DETAILED DESCRIPTION

Figure 1:
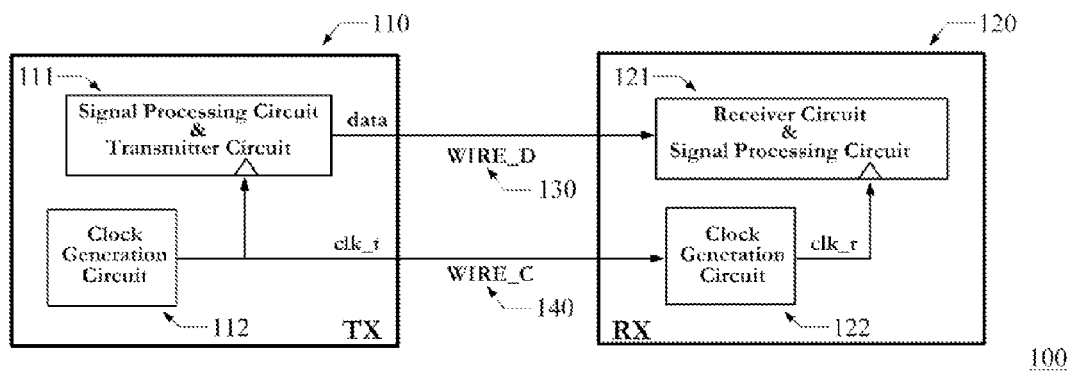
FIG. 1 is an electrical diagram, in block form, showing a transmitter and receiver system with a data bus line and a clock bus line for communication.

Reference will now be made in detail to various embodiments of the invention, examples of which are illustrated in the accompanying drawings. While the invention will be described in conjunction with the following embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description, numerous specific details are set forth in order to provide a thorough understanding of the present invention. However, it will be readily apparent to one skilled in the art that the present invention may be practiced without these specific details. In other instances, well-known methods, procedures, components, and circuits have not been described in detail so as not to unnecessarily obscure aspects of the present invention.

Some portions of the detailed descriptions that follow are presented in terms of processes, procedures, logic blocks, functional blocks, processing, and other symbolic representations of operations on data bits, data streams or waveforms within a computer, processor, controller and/or memory. These descriptions and representations are generally used by those skilled in the arts of VLSI-circuit-and-system design to effectively convey the substance of their work to others skilled in the art. A process, procedure, logic block, function, process, etc., is herein, and is generally, considered to be a self-consistent sequence of steps or instructions leading to a desired and/or expected result. The steps generally include physical manipulations of physical quantities. Usually, though not necessarily, these quantities take the form of electrical, magnetic, optical, or quantum signals capable of being stored, transferred, combined, compared, and otherwise manipulated in a computer or data processing system. It has proven convenient at times, principally for reasons of common usage, to refer to these signals as bits, waves, waveforms, streams, values, elements, symbols, characters, terms, numbers, or the like.

It should be borne in mind, however, that all of these and similar terms are associated with the appropriate physical quantities and are merely convenient labels applied to these quantities. Unless specifically stated otherwise and/or as is apparent from the following discussions, it is appreciated that throughout the present application, discussions utilizing terms such as "processing," "operating," "computing," "calculating," "determining," "manipulating," "transforming," "displaying" or the like, refer to the action and processes of a computer or signal processing system, or similar processing device (e.g., an electrical, optical, or quantum computing or processing device), that manipulates and transforms data represented as physical (e.g., electronic) quantities. The terms refer to actions and processes of the processing devices that manipulate or transform physical quantities within the component(s) of a system or architecture (e.g., registers, memories, flip-flops, other such information storage, transmission or display devices, etc.) into other data similarly represented as physical quantities within other components of the same or a different system or architecture.

Furthermore, for the sake of convenience and simplicity, the terms "clock," "time," "rate," "period," "frequency" and grammatical variations thereof are generally used interchangeably herein, but are generally given their art-recognized meanings. Also, for convenience and simplicity, the terms "data," "data stream," "waveform" and "information" may be used interchangeably, as may the terms "connected to," "coupled with," "coupled to," and "in communication with" (each of which may refer to direct or indirect connections, couplings, and communications), as may the terms "electrical path," "channel," "wire" (each of which may refer to a physical channel for transferring electrical signal), as may the terms "signal," "pulse," "pulse train," "a sequence of digital data" (each of which may refer to an electrical signal that has only two values: zero and one), but these terms are also generally given their art-recognized meanings.

Figure 2:
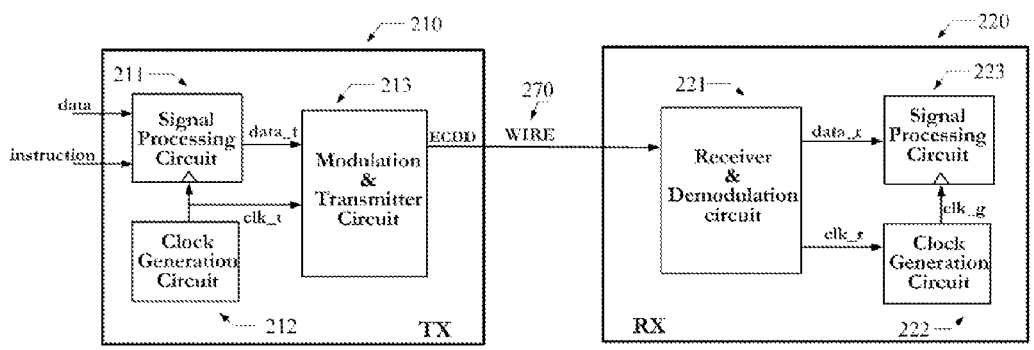
FIG. 2 is an electrical diagram, in block form, showing a transmitter and receiver system with one bus line for communication.

Referring now to FIG. 2, the principle of one-wire communication bus will be explained. The transmitter subsystem 210 has three functional circuit blocks: signal processing circuit 211, clock generation circuit 212 and modulation & transmitter circuit 213. The signal processing circuit 211 receives external information from signal data and performs certain signal processing functions on the information according to the given instruction received as signal instruction. The resulting new information, data_t, is required to be transferred to the receiver subsystem for further processing. The transmitter subsystem 210 also includes a clock generation circuit 212 that produces the clock signal, clk_t, which is used to control the signal processing circuit 211 as its driving clock. The transmitter subsystem 210 further includes a modulation & transmitter circuit 213 that combines the data_t and clk_t into one signal ECDD. Circuit 213 then outputs the ECDD signal into the communication channel that is represented by the WIRE 270.

At the receiver side, subsystem 220 has three functional circuit blocks: receiver & demodulation circuit 221, signal processing circuit 223 and clock generation circuit 222. Circuit 221 latches the ECDD signal from wire 270. It then decodes and decomposes it into two signals: data data_r and clock clk_r. Clock generation 222 takes clk_r and reconditions it by frequency division or frequency multiplication, or by phase (or delay) compensation. The resulting clock signal clk_g is used to drive circuit 223. The signal processing circuit 223 takes data_r and clk_g as its data and clock inputs and further processes the information.

Figure 3:
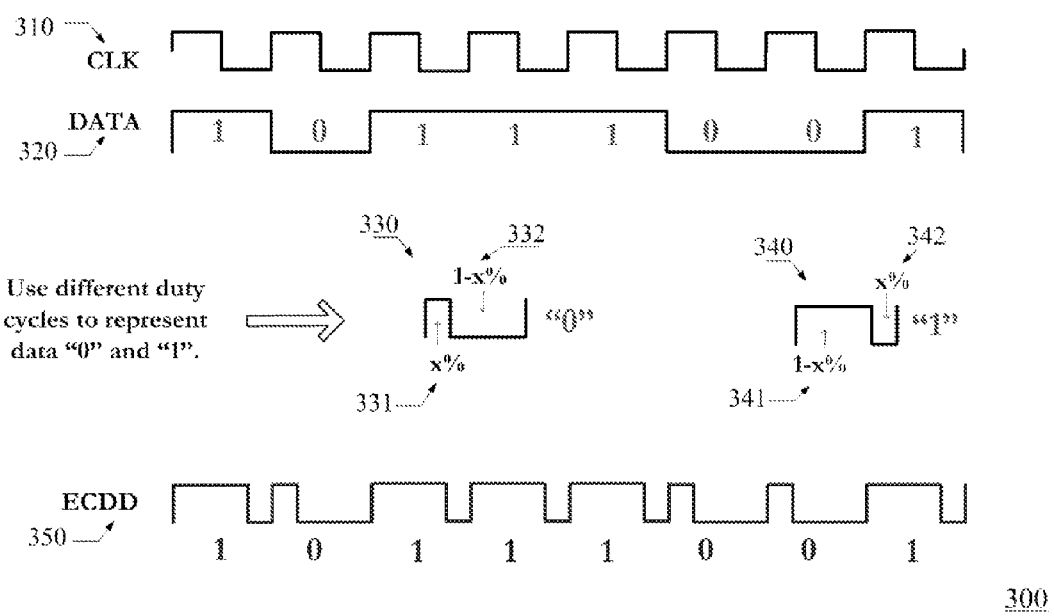
FIG. 3 is an electrical waveform diagram showing the electrical characteristic of ECDD signal.

Signal ECDD is an electrical pulse train that represents a sequence of digital data. Referring now to FIG. 3, the structure of ECDD signal is described as follows. Waveform 310 is a clock signal CLK which is used to send the data from the transmitter circuit. Waveform 320 is a sequence of digital data "10111001". It is used as an example to illustrate the principle. Waveform 330 represents a first pulse type. It is made of two parts of level-high 331 and level-low 332. If the length of this pulse measured in time, length-in-time, is considered as 100%, the level-high is designed to occupy x % of the length-in-time and the level-low is 1-x %. Waveform 340 represents a second pulse type. It also has two parts of level-high 341 and level-low 342. However, the level-high is designed to have 1-x % of the length-in-time and the level-low is x %. In circuit design, x is chosen as a value of x=p/q where both p and q are integers and p<p. As a result, the two pulse types are significantly different than each other.

The length-in-times of both pulse types is equal to the CLK's period. In the design of the ECDD signal, the first pulse type is chosen to represent digital zero while the second pulse type is chosen to represent digital one. To one skilled in the art, it is understandable that the first pulse type can also be used to represent digital one and the second pulse type for digital zero. When these pulses are joined together in series, the ECDD pulse train can represent a sequence of digital data as illustrated in the waveform 350.

Figure 4:
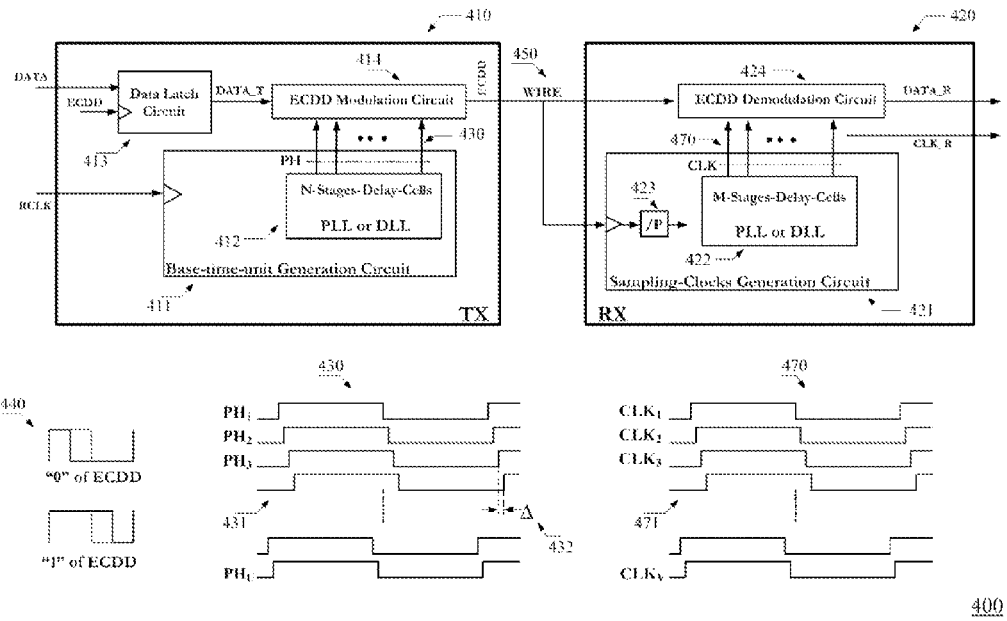
FIG. 4 is an electrical diagram, in block and waveform forms, showing the structure of one-wire communication bus of using pulse-edge for clock and pulse-duty-cycle for data.

Referring now to FIG. 4, the present invention of one-wire communication bus using ECDD signal will be explained. Transmitter 410 needs to send a sequence of digital data value to receiver 420. The electrical path in between is wire 450. The electrical signal inside the wire 450 is in ECDD format. Transmitter 410 comprises of three functional circuit blocks: data latch circuit 413, base-time-unit generation circuit 411 and ECDD modulation circuit 414. Circuit 413 latches an input digital signal DATA by using ECDD as it clock. Its output DATA_T is fed to circuit 414. The base-time-unit generation circuit 411 contains a N-stages-delay-cells. It also receives an input RCLK having a known frequency. The N-stage-delay-cells are configured either as a VCO (voltage controlled oscillator) or as a delay chain so that it can lock to the RCLK through a PLL (phase locked loop) or DLL (delay locked loop) 412.

Circuit 412 produces a plurality of signals PH that are the outputs from all of the cells in the N-stages-delay-cells. The waveforms of this plurality of signals are depicted in waveform 430. The waveform of one such signal is depicted in waveform 431. The N-stages is made of identical cells. As a result, their outputs $PH_1, PH_2, \ldots, PH_U$ are evenly spaced in one oscillation cycle (in the case of PLL) or one delay cycle (in the case of DLL). Thus, they are termed evenly-spaced-in-phase signals. The base-time-unit, as labeled in 432, is the time span between the rising (or falling) edges of any two adjacent such signals. In the case of a delay chain (used in DLL), U=N. In the case of a VCO (used in PLL), U=N if the delay cell is single-ended and U=N*2 when the delay cell is differential. This plurality of signals PH is fed to circuit 414.

ECDD modulation circuit 414 receives the plurality of signals PH and creates the ECDD pulse train based on the values of DATA_T received from data latch circuit 413. The working principle of circuit 414 can be explained with the help of FIG. 5. A circuit of Direct Period Synthesizer 510 receives the inputs of signal PH 530 and DATA_T 520. It creates an electrical pulse train wherein each pulse's length-in-time (defined as length measured in time) is $(p+q)\cdot\Delta$ where both p and q are integers and p<q. If DATA_T="0" or is "logic low", a pulse type 511 is created where the length-in-time-0 (defined as length measured in time when logic level is low) is $p\cdot\Delta$. If DATA_T="1" or is "logic high", a pulse type 512 is created where the length-in-time-1 (defined as length measured in time when logic level is high) is $q\cdot\Delta$. In both types of the pulses, there is one portion of logic_0 and one portion of logic_1. Further, there is one rising edge (defined as the transition from logic_0 to logic_1) and one falling edge (defined as the transition from logic_1 to logic_0). The rising edge (or the falling edge) can be used as clock to drive circuit.

After each pulse is created, it is joined in series with the pulses created in previous times. An exemplary digital data sequence 520 of value "10111001" is used to illustrate the principle. An ECDD pulse train 540 is the result from circuit 510. The circuit detail of direct period synthesizer 510 can be found in [1] or chapter 4 of [2]. To one skilled in the art, it can be understood that pulse types 511 and 512 can be swapped to represent "1" and "0", respectively.

Figure 5:
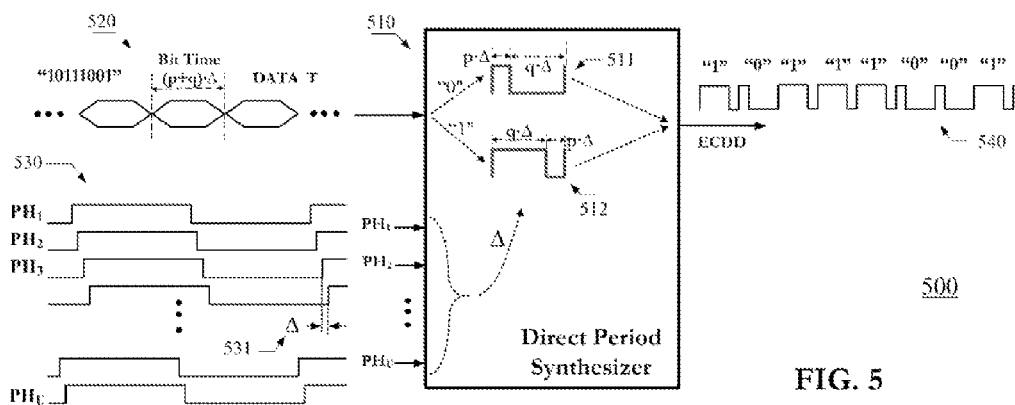
FIG. 5 is an electrical diagram, in block and waveform forms, showing the principle of using direct period synthesizer to create the ECDD pulse train.
Figure 6:
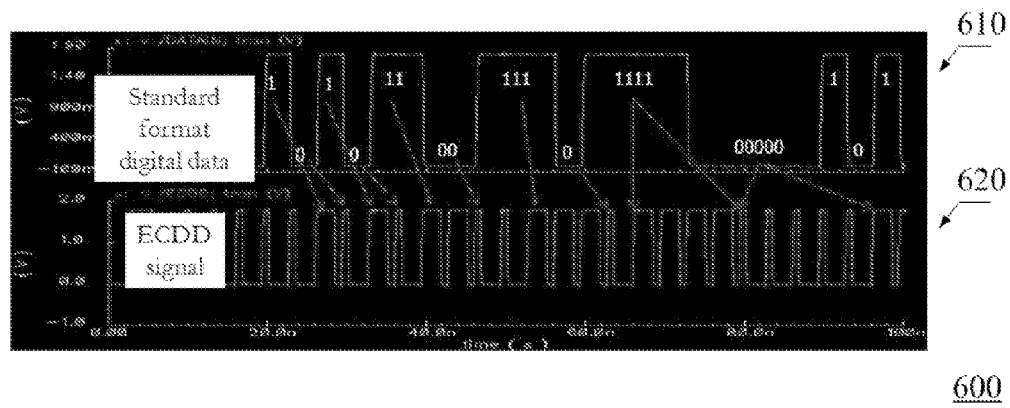
FIG. 6 is a diagram showing the simulation result of an ECDD pulse train from a direct period synthesizer circuit.

FIG. 6 shows a simulation result of ECDD signal from a circuit constructed according to the principle described in FIG. 5. Waveform 610 is a sequence of digital data in conventional format. In each data cycle, the logic level is either "high" or "low" to represent "1" or "0". Waveform 620 is the corresponding ECDD pulse train outputted from the circuit where pulse type 511 is for "0" and 512 is for "1". Waveform 620 is slightly delayed from 610 due to the processing time required by the real circuit.

Referring now back to FIG. 4, receiver 420 comprising two functional circuits of sampling-clocks generation circuit 421 and ECDD demodulation circuit 424. Circuit 421 contains a M-stages-delay-cells. The M-stages-delay-cells are configured either as a VCO (voltage controlled oscillator) or as a delay chain so that it can lock to a reference signal through a PLL or a DLL 422. The ECDD signal is received by circuit 421 and is optionally divided down by a frequency divider 423 of ratio P (P could be 1 if division is not needed). Its resulting signal is used as the reference signal for the PLL. The PLL or DLL is required to be designed in such way that one oscillation cycle (in the case of PLL) or one delay cycle (in the case of DLL) is equal to one ECDD pulse length (i.e. the ECDD signal and PLL/DLL output signal have same frequency).

Circuit 422 produces a plurality of signals CLK that are the outputs from all of the cells in the M-stages-delay-cells. The waveforms of this plurality of signals are depicted in waveform 470. The waveform of one such signal is depicted in waveform 471. The M-stages is made of identical cells. As a result, their outputs $CLK_1, CLK_2, \ldots, CLK_V$ are evenly spaced in one oscillation cycle (in the case of PLL) or one delay cycle (in the case of DLL). Thus, they are termed as evenly-spaced-in-phase sampling clocks. In the case of a delay chain (used in DLL), V=M. In the case of a VCO (used in PLL), V=M if the delay cell is single-ended and V=M*2 when the delay cell is differential. This plurality of signals CLK is fed to circuit 424 as the clocks to drive a group of sampling cells.

Figure 7:
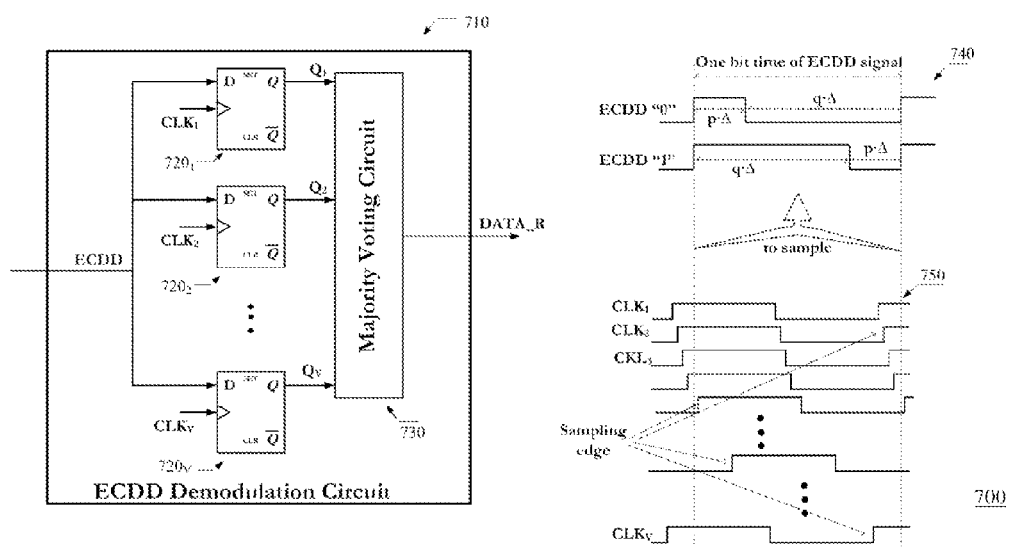
FIG. 7 is an electrical diagram, in block and waveform forms, showing the principle of decoding the ECDD pulse train.

Referring now to FIG. 7, the ECDD demodulation circuit will be explained. ECDD demodulation circuit 710 contains a group of sampling cells 720. In one embodiment, the number of cells is V which is equal to the number of sampling clocks. Circuit 710 receives the plurality of signals CLK from the sampling-clocks generation circuit. Each of the signals in this plurality of signals CLK is used to drive one sampling cell. Circuit 710 also receives ECDD signal as its data input. The received ECDD signal is fed to the data inputs of all the sampling cells. The outputs from all the sampling cells are fed to a majority voting circuit 730.

Circuit 730 makes the decision of whether the received current ECDD pulse represents a "0" or a "1". It makes the decision by using majority rule as explained in the following. Waveform 740 represents one pulse length, or one bit time, of ECDD signal. Waveform 750 depicts the sampling clocks CLK waveforms. Since the ECDD signal and the CLK signal have same frequency, there are V sampling edges within one ECDD pulse length. For a particular sampling edge, the output from the sampling cell driven by this sampling edge will be a "0" if the sampling edge falls in the region of ECDD pulse level low. It outputs a "1" if the sampling edge falls in the region of ECDD pulse level high. It therefore is understood that the outputs of this group of sampling cells $Q_1, Q_2, \ldots, Q_V$ is a group of V bits made of "0" and "1". The ratio of the numbers of "1" to "0" is equal to p/q if the ECDD pulse represents a "0". The same ratio becomes q/p if the ECDD pulse represents a "1". Since p<q, the decision can be made using the rule that the current ECDD pulse represents "0" if there are more "0" than "1" in the $[Q_1, Q_2, \ldots, Q_V]$. In the contrast, current ECDD pulse represents "1" if there are more "1" than "0" in the $[Q_1, Q_2, \ldots, Q_V]$. Majority voting circuit 730 outputs this decision in its data output port as signal DATA_R.

Referring now back to FIG. 4, one of the signals from the plurality of signals CLK is outputted as the receiver 420's output clock signal CLK_R. The DATA_R from the ECDD demodulation circuit is outputted as the receiver 420's output data signal. Signal DATA_R and CLK_R are fed to the down-stream signal processing circuit as a data-clock pair. Using the one-wire system described in FIG. 4, DATA_R outputted from the receiver has the same values and bears the same rate as that of DATA in the transmitter. This data communication task is accomplished using one electrical wire (or one channel, one path).

Figure 8:
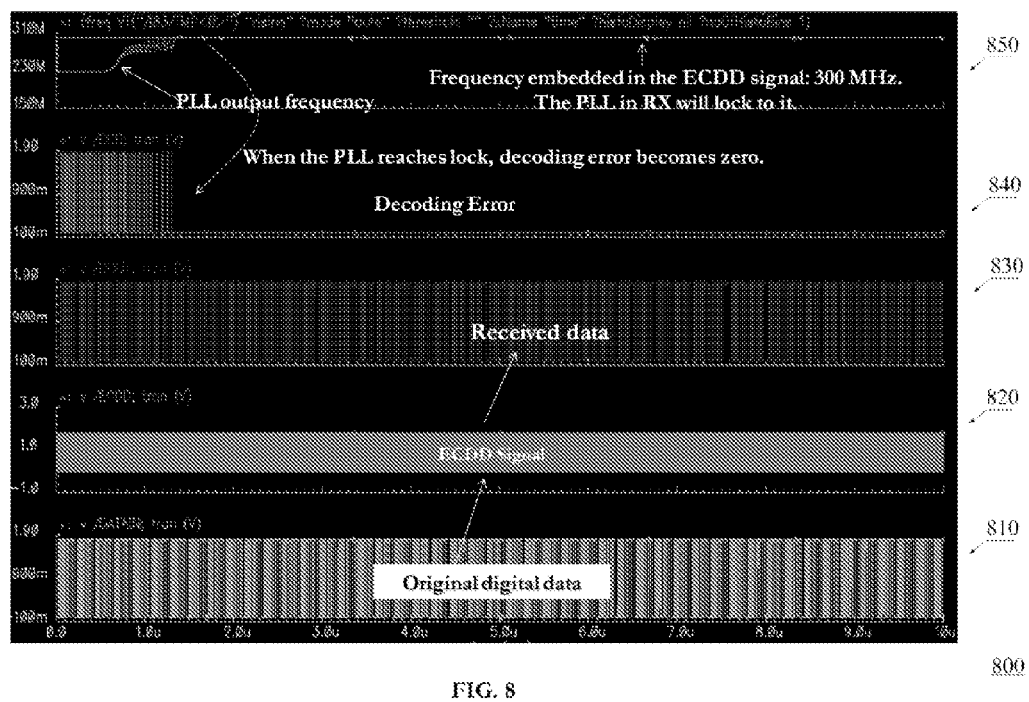
FIG. 8 is a diagram showing the simulation result of the one-wire communication bus.
Figure 3:
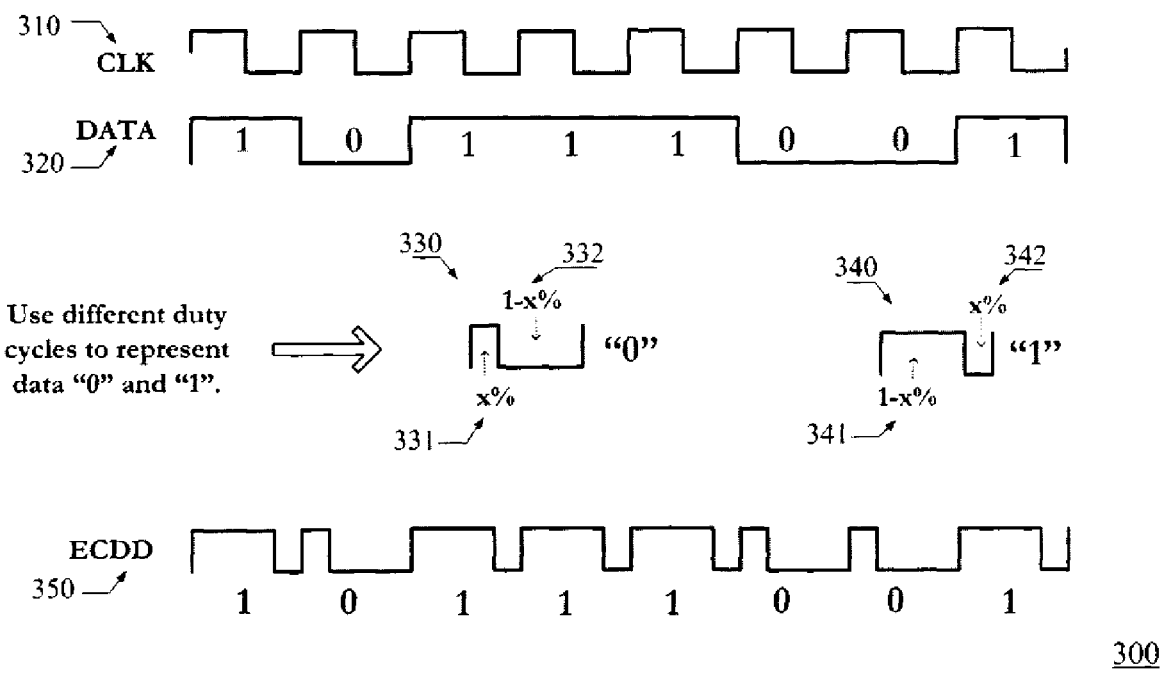
Figure 4:
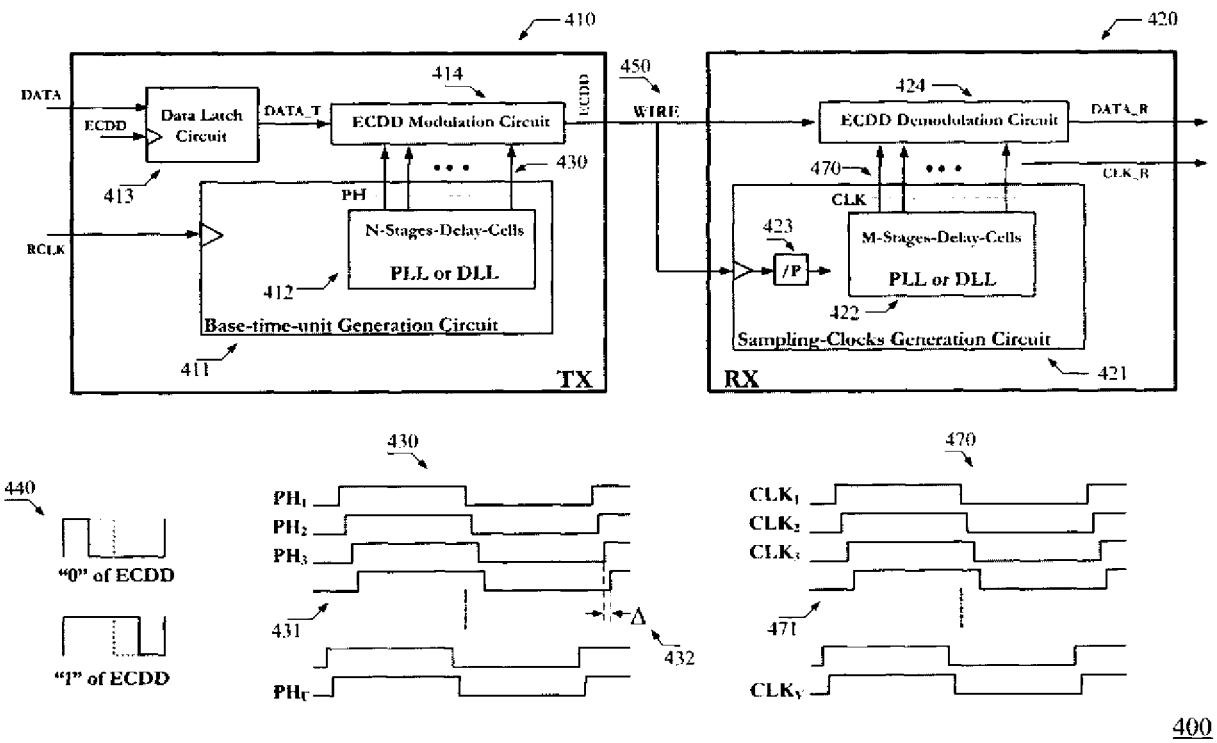
Figure 5:
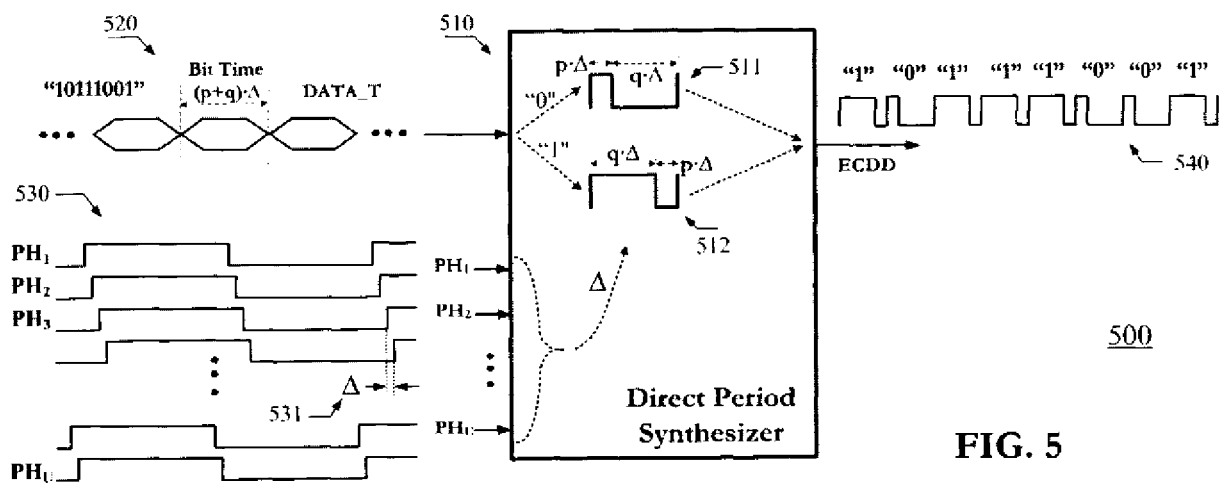
Figure 6:
Figure 7:
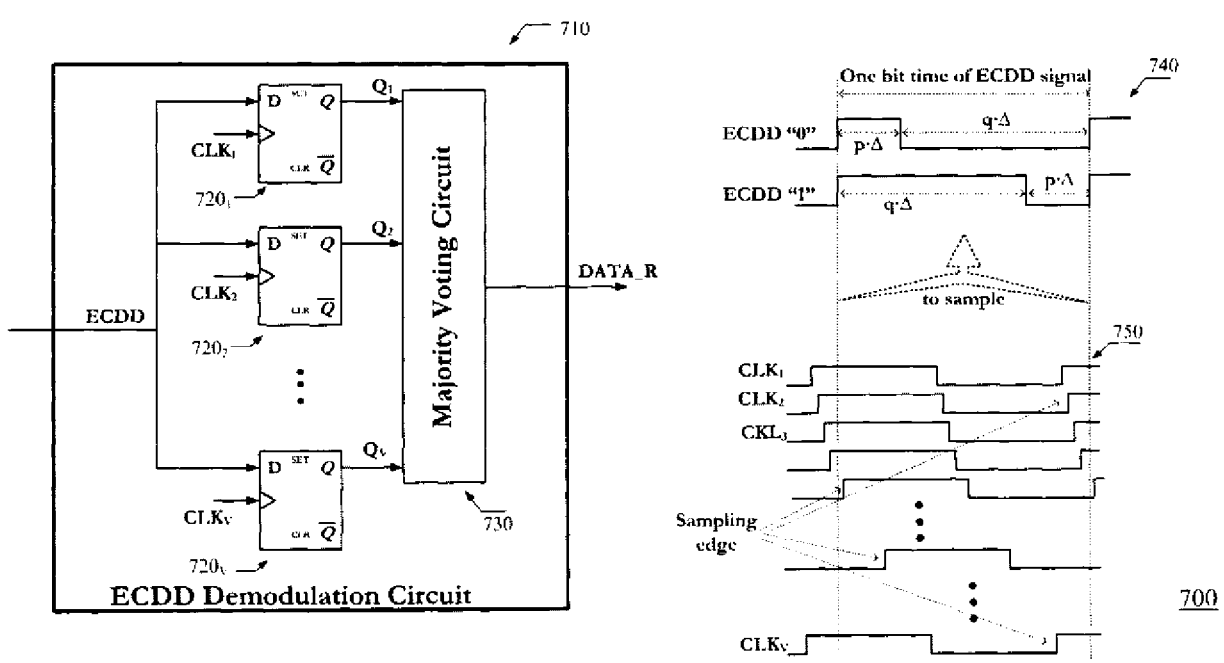
Figure 8:
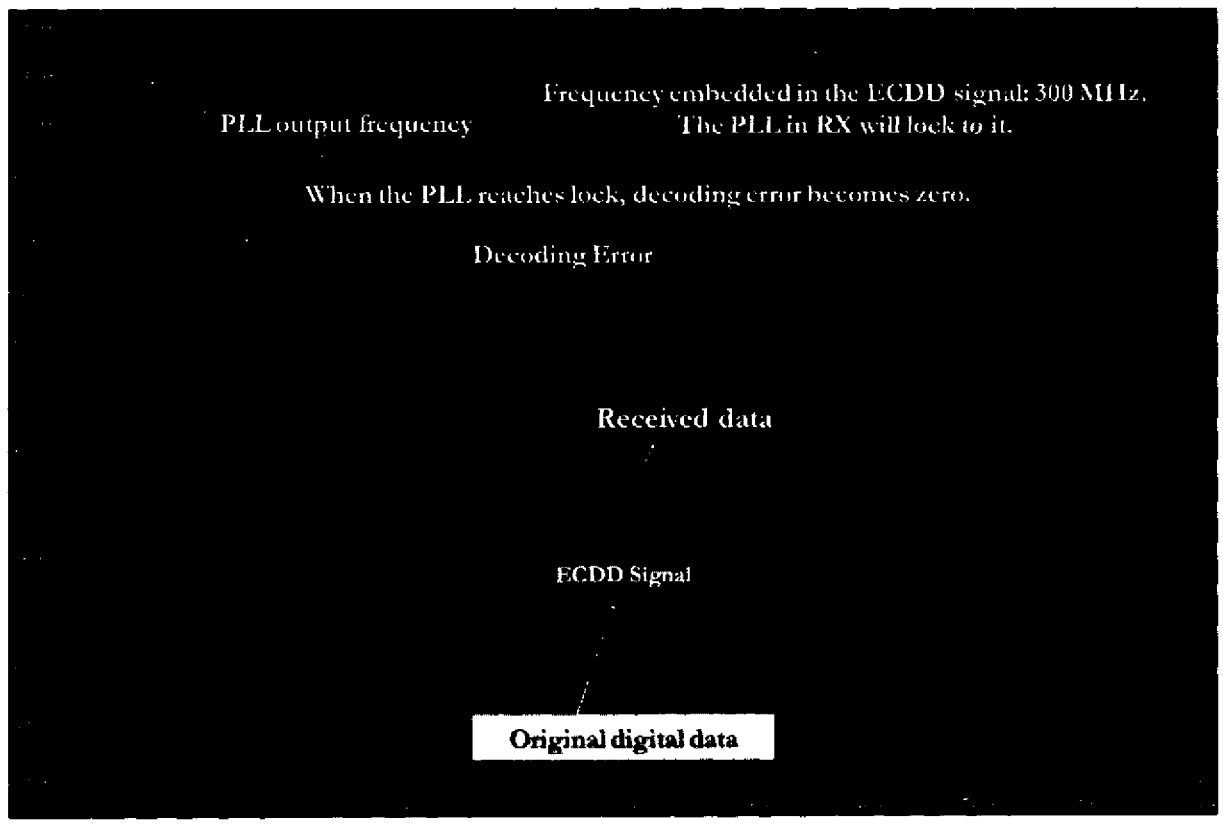

FIG. 8 shows the simulation result of present invention of one-wire communication bus using circuit constructed according to FIG. 4. Plot 810 is a sequence of digital data in its conventional digital format where logic level high represents "1" and logic level low is "0". Plot 820 is its corresponding ECDD signal generated by the ECDD modulation circuit. Plot 830 is the output data from the ECDD demodulation circuit (the DATA_R in FIG. 4 and FIG. 7). Plot 840 is the output from an error-checking circuit. When the received data (DATA_R) has error, the error-checking circuit's output is in logic level high. Otherwise, it is in logic level low. Plot 850 has two traces. The trace of "PLL output frequency" is the frequency measurement of one of the sampling clocks generated by the PLL in the receiver. The trace of "frequency embedded in the ECDD signal" is the frequency measurement of the ECDD signal.

In this simulation of FIG. 8, the original digital data is generated by a 9-elements PRBS (PseudoRandom Binary Sequence) encoder using a driving clock of 300 MHz. The error-checking circuit is made of its corresponding 9-elements PRBS decoder. Thus, the inherent randomness of both the PRBS encoder and decoder matches. As a result, the error-checking circuit will report no error if the data from the transmitter is received correctly by the receiver. In this simulation, the error-checking circuit is clocked by one of the PLL outputs. As shown in the plot 850, when PLL reaches lock, the sampling clock's frequency (one of the VCO outputs) matches that of ECDD signal (300 MHz, same as the PRBS encoder frequency). Furthermore, after the PLL reaches lock, the decoding error signal becomes logic level low which indicates the fact that the sampling circuit and the majority voting circuit correctly receives and decodes the ECDD signal.

The present invention further relates to a method of creating an ECDD signal that contains both clock and data information and using it for one-wire data communication between a transmitter and a receiver. The method includes the first step of creating a base-time-unit from a plurality of evenly-spaced-in-phase signals and the second step of using the base-time-unit to create two types of pulses for representing digital zero and one. The pulses, selected from said two types of pulses, are created and joined together in series according to the sequence of digital data that needs to be transmitted. At the receiving side, the ECDD signal is latched by a group of sampling cells and their outputs are used to decode the ECDD signal using majority rule.

CONCLUSION/SUMMARY

Thus, the present invention provides circuits and methods to combine data signal and clock signal into one electrical signal and use it for data communication between a transmitter and a receiver so that the skew problem between data and clock is eliminated. The present invention can reduce the number of electrical paths between the transmitter and the receiver to achieve the goals of lower cost, higher reliability and smaller physical size The present invention uses a direct period synthesizer to create an electrical signal whose pulse edge functions as clock signal and whose pulse duty cycle is used to represent digital value of zero and one. Thus, the present invention advantageously combines two electrical signals into one that can result in the reduction in manufacture cost and system physical size. The present invention further improves the system reliability by eliminating the skew problem.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

[1] L. Xiu and Z. You, "High Speed Precision Frequency and Phase Synthesis," U.S. Pat. No. 6,940,937, December 2005.

[2] L. Xiu, "Nanometer Frequency Synthesis beyond Phase Locked Loop," August 2012, John Wiley IEEE press.

What is claimed is:

1. A system for one-wire communication bus of using pulse-edge for clock and pulse-duty-cycle for data, comprising:

a reference clock signal input for receiving a reference clock signal;

a data signal input for receiving a sequence of digital data;

an electrical connection having a first end and a second end, for transferring an Edge-for-Clock-Duty-cycle-for-Data (ECDD) signal, said ECDD signal is an electrical pulse train wherein each pulse consists of a portion of level-high and a portion of level-low, a transition from level-low to level-high is defined as rising edge and a transition from level-high to level-low is defined as falling edge, the rising and falling edges are pulse-edges, a ratio of time used by level-high to time used by level-low is pulse-duty-cycle;

a transmitter circuit for generating and outputting said ECDD signal, comprising:

a data output for delivering generated ECDD signal;

a data latch circuit, having a first input receiving a clock signal, having a second input receiving the sequence of digital data from said data signal input, for generating a sequence of digital data according to a received data using received clock signal, having an output for delivering said sequence of digital data;

a base-time-unit generation circuit, having an input receiving said reference clock signal, for generating a plurality of evenly-spaced-in-phase outputs, having an output for delivering said plurality of evenly-spaced-in-phase outputs, the base-time-unit is a time span between rising (or falling) edges of any two adjacent said outputs;

a ECDD modulation circuit, having a first input receiving said sequence of digital data generated from the data latch circuit, having a second input receiving said plurality of outputs generated from the base-time-unit generation circuit, for creating each pulse in ECDD pulse train according to a value of said sequence of digital data in each clock cycle, having an output for delivering the generated ECDD signal;

wherein said ECDD signal is connected to the first input of the data latch circuit as clock signal;

a receiver circuit for receiving and decoding said ECDD signal, comprising:

a data input for receiving the ECDD signal;

a sampling-clocks generation circuit, having an input receiving said ECDD signal, for generating a plurality of evenly-spaced-in-phase sampling clock signals, having a first output for delivering said plurality of sampling clock signals, having a second output for delivering a selected one from said plurality of sampling clock signals as the receiver circuit's clock output;

a ECDD demodulation circuit, having a first input receiving said ECDD signal, having a second input receiving said plurality of sampling clock signals from the sampling-clocks generation circuit, for generating a sequence of digital data according to the pulse-duty-cycle of each pulse in said ECDD signal, having an output for delivering said sequence of digital data as the receiver circuit's data output;

wherein said data output of the transmitter is connected to the first end of said electrical connection;

wherein said data input of the receiver is connected to the second end of said electrical connection.

2. The system of claim 1, wherein the base-time-unit generation circuit in the transmitter circuit comprises:

an integer-N PLL, for generating a plurality of evenly-spaced-in-phase outputs, comprising:
  a phase detector having a first input receiving said reference clock signal and a second input receiving a feedback signal, for producing an error signal at an output corresponding to a phase and frequency difference between the reference and feedback signals;
  a filter for low-pass filtering the error signal;
  a frequency divider of certain dividing ratio having an input receiving a clock signal, and an output coupled to the phase detector as the feedback signal;
  a voltage-controlled oscillator for generating the plurality of evenly-spaced-in-phase outputs at a frequency selected by the filtered error signal, wherein one of the plurality of the outputs is coupled to the frequency divider as the input signal, having an output for delivering said plurality of evenly-spaced-in-phase outputs.

3. The system of claim 1, wherein the base-time-unit generation circuit in the transmitter circuit comprises:

a Delay Locked Loop, for generating a plurality of evenly-spaced-in-phase outputs, comprising:
  a phase detector having a first input receiving said reference clock signal and a second input receiving a feedback signal, for producing an error signal at an output corresponding to a phase and frequency difference between the reference and feedback signals;
  a filter for low-pass filtering the error signal;
  a series of delay stages made of identical cells for generating a time delay at a value selected by the filtered error signal, wherein the input of the first cell is connected to said reference signal, wherein the output of the last cell is coupled to the phase detector as the feedback signal, having an output for delivering said plurality of outputs generated from the outputs of all said cells.

4. The system of claim 1, wherein the ECDD modulation circuit in the transmitter circuit comprises:

a direct period synthesis circuit, having a first input receiving said sequence of digital data from the data latch circuit, having a second input receiving said plurality of outputs from the base-time-unit generation circuit, for synthesizing a pulse train wherein each pulse's length-in-time is p+q multiples of the base-time-unit where both p and q are integers and p<q, each pulse's length-in-time-of-level-high is p multiples of the base-time-unit and each pulse's length-in-time-of-level-low is q multiples of the base-time-unit when a value of received digital data is zero, each pulse's length-in-time-of-level-low is p multiples of the base-time-unit and each pulse's length-in-time-of-level-high is q multiples of the base-time-unit when a value of received digital data is one, having an output for delivering said ECDD pulse train.

5. The system of claim 1, wherein the sampling-clocks generation circuit in the receiver circuit comprises:

a pre-scale frequency divider of certain dividing ratio having an input receiving said ECDD signal, and an output for delivering the divided down ECDD signal;

an integer-N PLL, for generating a plurality of evenly-spaced-in-phase sampling clock signals, comprising:
  a phase detector having a first input receiving said divided down ECDD signal and a second input receiving a feedback signal, for producing an error signal at an output corresponding to a phase and frequency difference between the reference and feedback signals;
  a filter for low-pass filtering the error signal;
  a frequency divider of certain dividing ratio having an input receiving a clock signal, and an output coupled to the phase detector as the feedback signal;
  a voltage-controlled oscillator for generating a plurality of evenly-spaced-in-phase outputs at a frequency selected by the filtered error signal, wherein one of the plurality of the outputs is coupled to the frequency divider as the input signal, said plurality of evenly-spaced-in-phase outputs are outputted as the sampling clock signals.

6. The system of claim 1, wherein the sampling-clocks generation circuit in the receiver circuit comprises:

a Delay Locked Loop, for generating a plurality of evenly-spaced-in-phase sampling clock signals, comprising:
  a phase detector having a first input receiving said ECDD signal and a second input receiving a feedback signal, for producing an error signal at an output corresponding to a phase and frequency difference between the reference and feedback signals;
  a filter for low-pass filtering the error signal;
  a series of delay stages made of identical cells for generating a time delay at a value selected by the filtered error signal, wherein the input of the first cell is connected to said reference signal, wherein the output of the last cell is coupled to the phase detector as the feedback signal, the outputs from all the cells are outputted as the sampling clock signals.

7. The circuit of claim 1, wherein the ECDD demodulation circuit in the receiver circuit comprises:

a group of sampling cells, for sampling the received ECDD signal, wherein each cell having a first input receiving the ECDD signal, wherein each cell having a second input receiving a selected one from said plurality of sampling clock signals, wherein each cell having an output for delivering the sampled result;

a majority voting circuit, having an input receiving the group of sampled results from said group of sampling cells, for generating decoding decision according to the received sampled results by using majority rule, having an output for delivering said decoding decision as the receiver circuit's output data.

8. A method of creating one-wire communication bus of using pulse-edge for clock and pulse-duty-cycle for data, comprising the steps of:

latching a sequence of digital data by using a signal as clock;

creating a base-time-unit from a first plurality of evenly-spaced-in-phase signals, the base-time-unit is a time span between rising (or falling) edges of any two adjacent signals of the first plurality of evenly-spaced-in-phase signals;

creating a Edge-for-Clock-Duty-cycle-for-Data (ECDD) signal of a pulse train according to values of received sequence of digital data, wherein each pulse's length-in-time is p+q multiples of the base-time-unit where both p and q are integers and p<q, each pulse's length-in-time-of-level-high is p multiples of the base-time-unit and each pulse's length-in-time-of-level-low is q multiples of the base-time-unit when a value of received digital data is zero, each pulse's length-in-time-of-level-low is p multiples of the base-time-unit and each pulse's length-in-time-of-level-high is q multiples of the base-time-unit when a value of received digital data is one;

using a generated ECDD signal as the clock when latching said sequence of digital data;

sending a generated ECDD signal of a pulse train to a receiver circuit through an electrical connection;

receiving the ECDD signal of a pulse train sent through said electrical connection in a receiver circuit;

creating a second plurality of evenly-spaced-in-phase signals as sampling clocks;

using said sampling clocks to drive a plurality of sampling cells to sample the ECDD signal received by the receiver;

decoding the received ECDD signal based on the sampling results using a majority voting circuit.

9. The method of claim 8, wherein the creating of the first plurality of evenly-spaced-in-phase signals comprising the steps of:

generating the plurality of evenly-spaced-in-phase signals from a voltage controlled oscillator;

locking the voltage controlled oscillator to an input reference signal of certain frequency through a phase locked loop.

10. The method of claim 8, wherein the creating of the first plurality of evenly-spaced-in-phase signals comprising the steps of:

generating the plurality of evenly-spaced-in-phase signals from a series of identical delay cells, the outputs from all the delay cells form the plurality of evenly-spaced-in-phase signals;

locking the series of delay cells to an input reference signal of certain frequency through a delay locked loop.

11. The method of claim 8, wherein the creating of the second plurality of evenly-spaced-in-phase signals comprising the steps of:

generating the plurality of evenly-spaced-in-phase signals from a voltage controlled oscillator;

locking the voltage controlled oscillator to the received ECDD signal or its divided down signal through a phase locked loop.

12. The method of claim 8, wherein the creating of the second plurality of evenly-spaced-in-phase signals comprising the steps of:

generating the plurality of evenly-spaced-in-phase signals from a series of identical delay cells, the outputs from all the delay cells form the plurality of signals;

locking the series of delay cells to the received ECDD signal through a delay locked loop.

13. The method of claim 8, wherein the decoding of the received ECDD pulse train comprising the steps of:

making the decision of whether current ECDD pulse represents a value of "one" or a "zero" by applying majority rule on the group of sampling results.

14. A method of creating an electrical pulse with desired pulse length and desired duty cycle based on value of a received digital data, comprising the steps of:

creating a base-time-unit from a plurality of evenly-spaced-in-phase signals, the base-time-unit is a time span between rising (or falling) edges of any two adjacent signals of said plurality of evenly-spaced-in-phase signals;

using a direct period synthesizer to synthesis a pulse length of an electrical pulse as p+q multiples of the base-time-unit, wherein both p and q are integer and p<q;

using a direct period synthesizer to synthesis a length-in-time-of-level-high of the electrical pulse as p multiples of the base-time-unit when a received data is zero, using a direct period synthesizer to synthesis a length-in-time-of-level-high of the electrical pulse as q multiples of the base-time-unit when a received data is one.

* * * * *

UNITED STATES PATENT AND TRADEMARK OFFICE
CERTIFICATE OF CORRECTION

| | |
|---|---|
| PATENT NO. | : 8,929,467 B1 |
| APPLICATION NO. | : 14/153148 |
| DATED | : January 6, 2015 |
| INVENTOR(S) | : Liming Xiu |

It is certified that error appears in the above-identified patent and that said Letters Patent is hereby corrected as shown below:

The Title page, showing the illustrative figure, should be deleted and substitute therefor the attached Title page.

In the Drawings

Delete drawings sheets 1-5 and substitute therefor the drawing sheets, consisting of figs. 1-8 as shown on the attached pages.

In the Specification

In column #5, lines 25-44, the third paragraph, is indented in the wrong direction. Please correct it.

In column #6, second paragraph, line 16, the "$CLK_y$" should be "$CLK_V$".

Signed and Sealed this
Thirty-first Day of March, 2015

Michelle K. Lee
*Director of the United States Patent and Trademark Office*

(12) United States Patent
Xiu

(10) Patent No.: US 8,929,467 B1
(45) Date of Patent: Jan. 6, 2015

(54) CIRCUITS AND METHODS FOR ONE-WIRE COMMUNICATION BUS OF USING PULSE-EDGE FOR CLOCK AND PULSE-DUTY-CYCLE FOR DATA

(71) Applicant: Liming Xiu, Plano, TX (US)

(72) Inventor: Liming Xiu, Plano, TX (US)

(73) Assignee: Liming Xiu, Plano, TX (US)

( * ) Notice: Subject to any disclaimer, the term of this patent is extended or adjusted under 35 U.S.C. 154(b) by 0 days.

(21) Appl. No.: 14/153,148

(22) Filed: Jan. 13, 2014

(51) Int. Cl.
H04B 3/00 (2006.01)
H04L 7/00 (2006.01)

(52) U.S. Cl.
CPC .................................. *H04L 7/0041* (2013.01)
USPC .......... 375/257; 375/220; 375/356; 375/355; 375/372; 375/373; 375/376

(58) Field of Classification Search
USPC ............ 375/257, 220, 356, 355, 372, 376, 373
See application file for complete search history.

(56) References Cited

U.S. PATENT DOCUMENTS

| 2002/0154721 A1* | 10/2002 | Harrison | 375/374 |
| 2008/0278211 A1* | 11/2008 | Beighley | 327/296 |
| 2009/0058481 A1* | 3/2009 | Kim et al. | 327/175 |

* cited by examiner

Primary Examiner — Kabir A Timory

(57) ABSTRACT

A one-wire communication bus for transferring a sequence of digital data from a transmitter to a receiver includes (a) an ECDD signal modulation circuit to create an electrical pulse train wherein each pulse's edge is used as clock signal and each pulse's duty cycle is used to represent digital value of zero and one; (b) an ECDD signal demodulation circuit to receive the ECDD pulse train using a group of sampling cells and to decode the sampled results using a majority voting circuit; (c) an electrical connection between a transmitter wherein the ECDD signal modulation circuit resides and a receiver wherein the ECDD signal demodulation circuit resides. Said ECDD signal is sent from the transmitter to the receiver through the electrical connection. Methods of creating the ECDD pulse train in the transmitter and decoding the ECDD pulse train in the receiver are also disclosed.

14 Claims, 5 Drawing Sheets

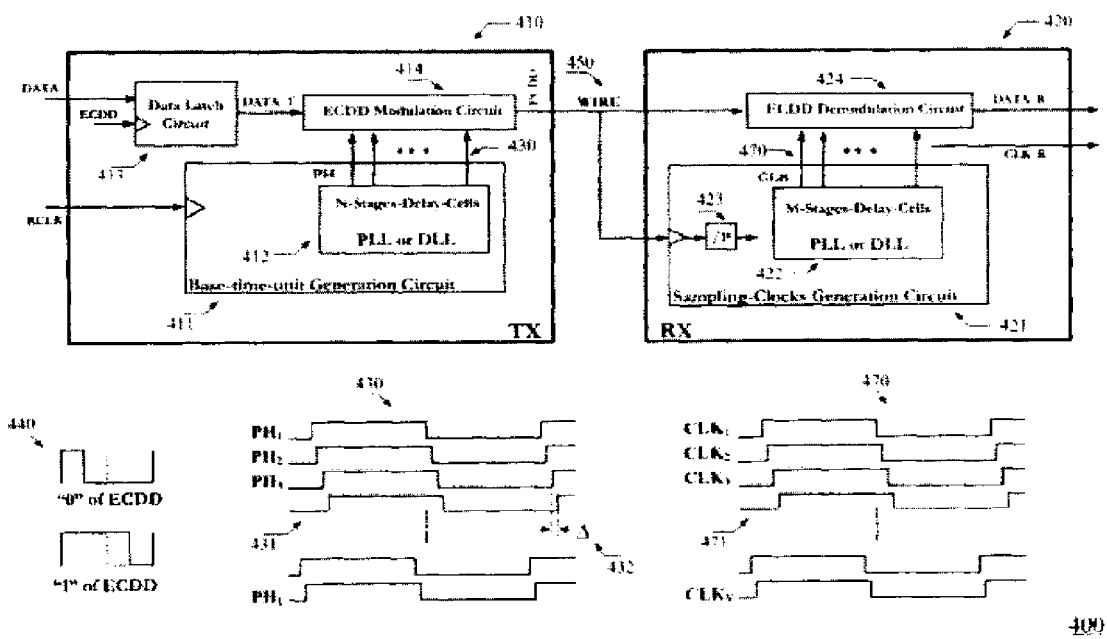

CERTIFICATE OF CORRECTION (continued)

U.S. Patent  Jan. 6, 2015  Sheet 1 of 5  8,929,467 B1

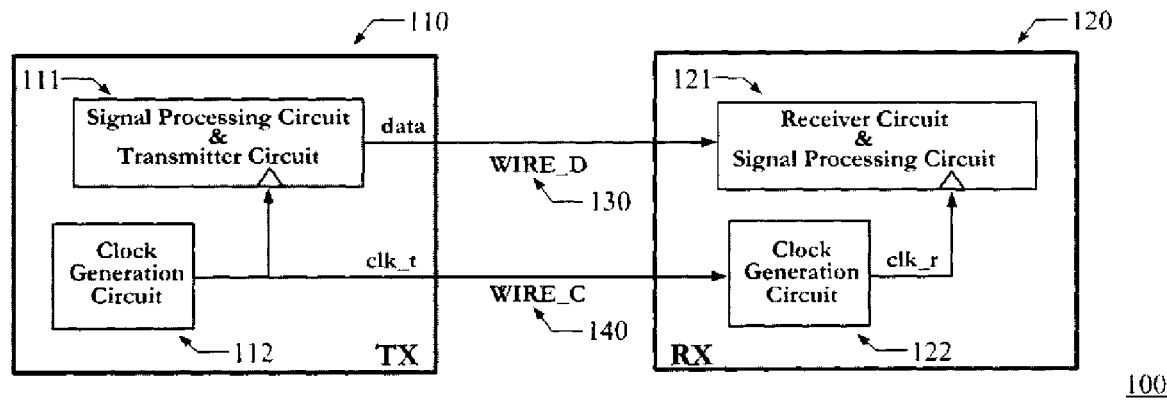

FIG. 1 (PRIOR ART)

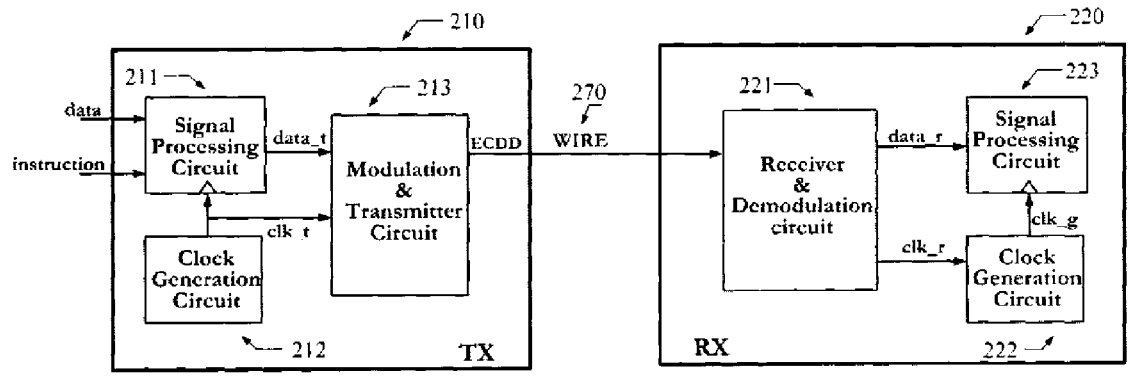

FIG. 2